Nov. 20, 1956 T. J. KEARNEY 2,771,023
APPARATUS FOR STERILIZATION OF CANNED FOODS
Filed July 25, 1950 3 Sheets-Sheet 1
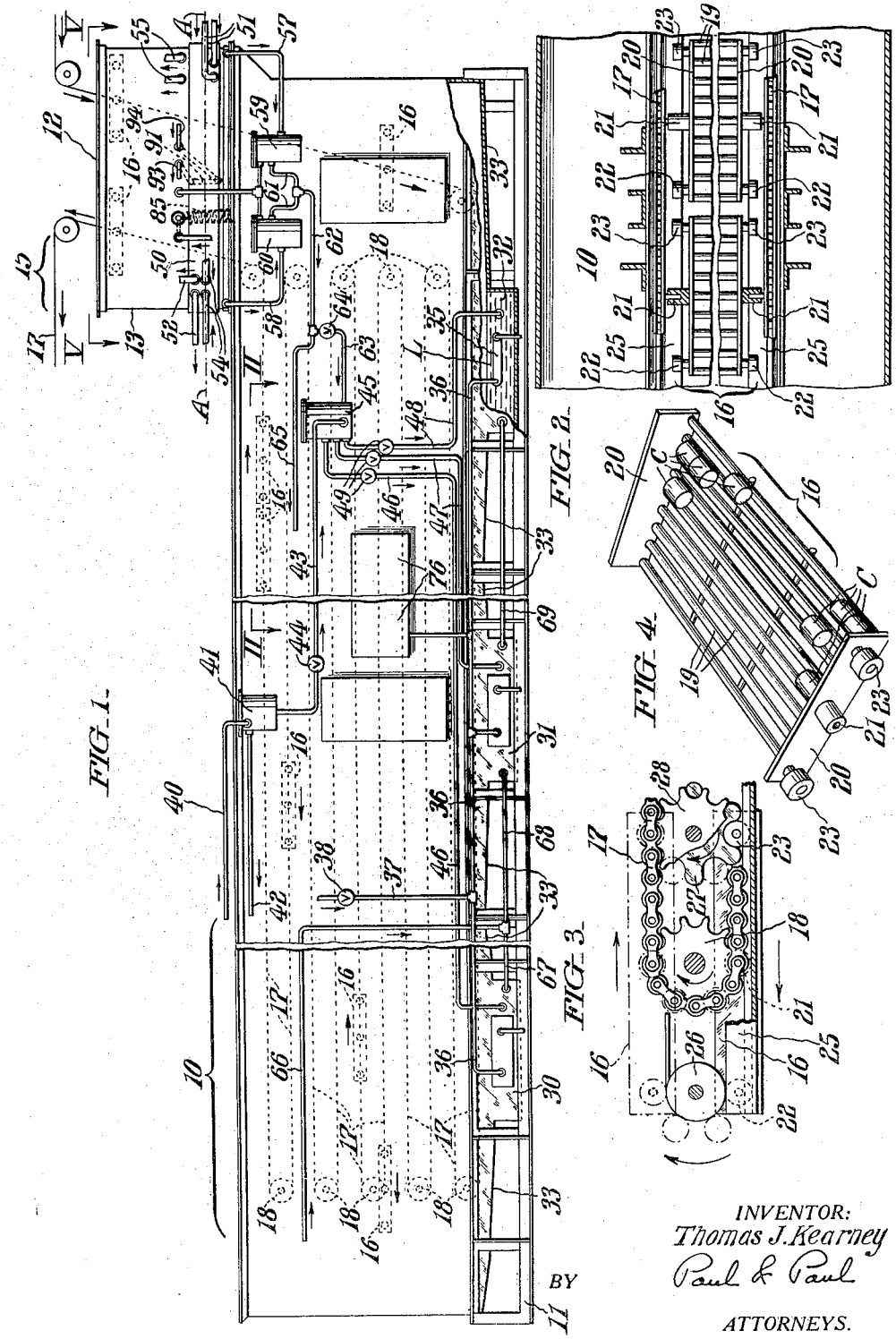
INVENTOR:
Thomas J. Kearney
BY Paul & Paul
ATTORNEYS.

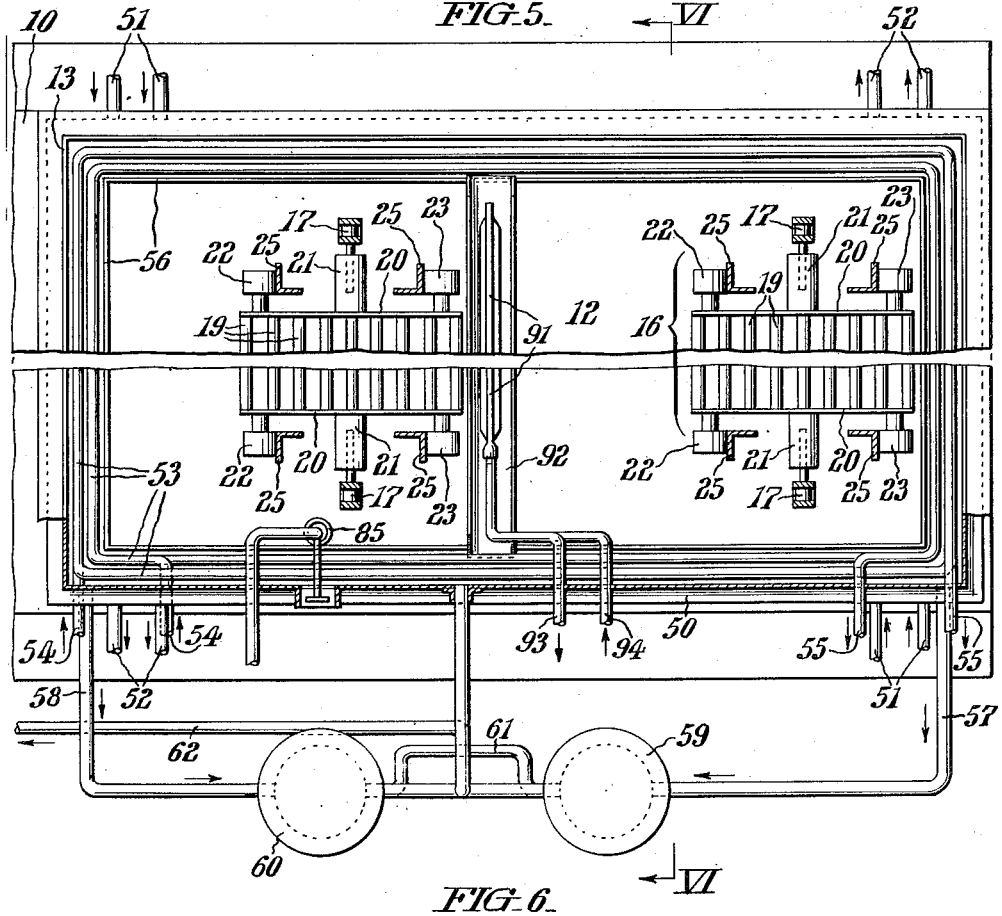
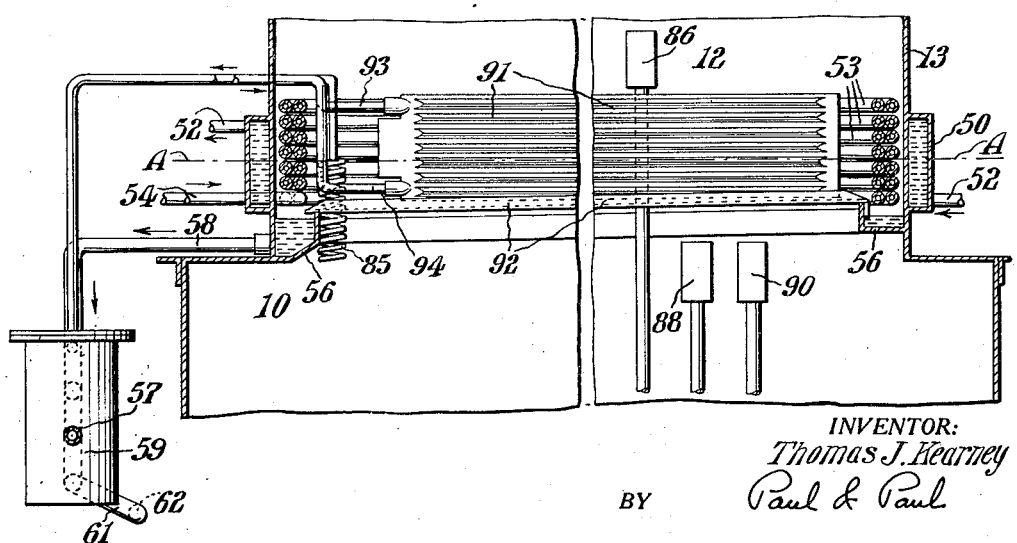

Nov. 20, 1956 T. J. KEARNEY 2,771,023
APPARATUS FOR STERILIZATION OF CANNED FOODS
Filed July 25, 1950 3 Sheets-Sheet 3
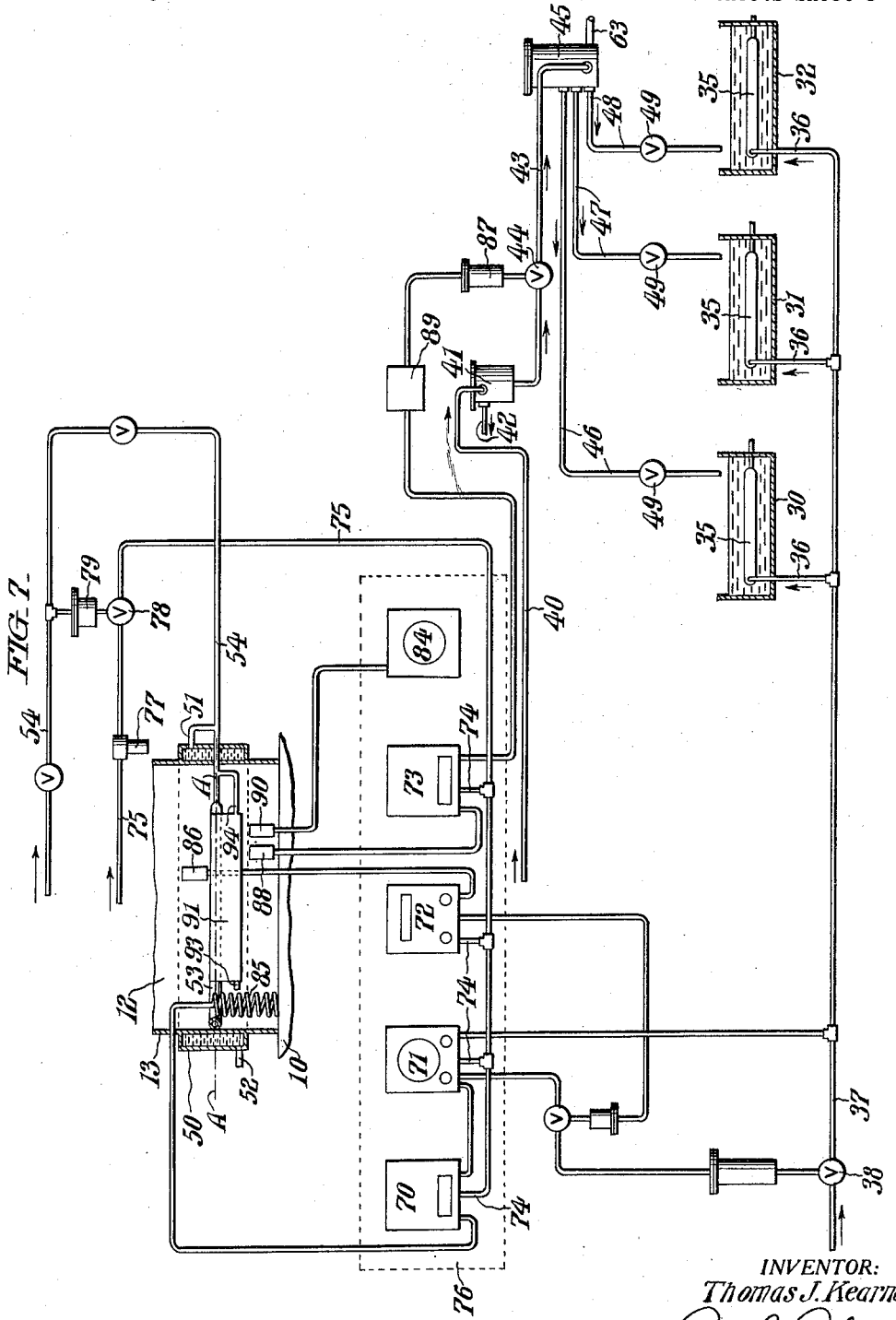
INVENTOR:
Thomas J. Kearney
BY Paul & Paul
ATTORNEYS.

United States Patent Office 2,771,023
Patented Nov. 20, 1956

2,771,023

APPARATUS FOR STERILIZATION OF CANNED FOODS

Thomas J. Kearney, Detroit, Mich., assignor to Detrex Corporation, Detroit, Mich., a corporation of Michigan Application July 25, 1950, Serial No. 175,728

11 Claims. (Cl. 99—330)

This invention relates to apparatus for sterilizing food products after they have been packed in sealed cans or other closed containers used in the food processing art. More specifically it is concerned with apparatus for sterilizing food products which embodies the passing of canned food products, by means of an endless conveyer, through chlorinated hydrocarbon vapors heated to the desired sterilization temperature.

The sterilization of food in sealed containers has ordinarily been carried out heretofore by placing batches of the sealed cans in closed chambers for subjection to the action of steam under pressure for definite time periods, the pressure of the steam being regulated in accordance with the nature of the packed products and the temperatures required for their proper sterilization. Operation under this prior art method has not been entirely satisfactory by reason of the loss of heat energy incident to opening the chambers after each treatment, and the time lost in removing the processed batches and in reloading the apparatus. However, efforts to provide a continuous process to replace the known batch processes have not been commercially satisfactory due to the problems involved in continuously maintaining temperatures of within plus or minus two degrees Fahrenheit or less.

My invention is directed in the main toward overcoming the above mentioned difficulties by providing apparatus which make it possible to sterilize canned food products in a continuous manner in a machine operating within predetermined narrow temperature ranges and at atmospheric pressure without any substantial loss of the heating medium used in the processing. This objective is realized in practice, as hereinafter more fully disclosed, through provision of an improved apparatus involving the use of a heat controlled vapor sterilization medium in which cans, containing the food to be sterilized, are carried over a circuitous course by an endless tray conveyer. The sterilization media utilized are heated heavier-than-air vapors of chlorinated hydrocarbons, such as trichlorethylene or perchlorethylene or controlled mixtures thereof, which are generated by boiling within an enclosure. The conveyer enters and emerges from the enclosure via a restricted upwardly extending opening in the roof thereof. The vapors are prevented from escaping through the opening by the establishment and maintenance of a condensation level within the extension above top line of the enclosure. Where chlorinated hydrocarbon mixtures are employed as the hot vapor source, means are provided for maintaining the relative proportions thereof substantially at a predetermined ratio so that the temperature of the vapor mixture remains substantially constant. This is a matter of prime importance in the sterilization of foods where the sterilization temperature must be held closely to a predetermined value sometimes within a range of plus or minus two degrees Fahrenheit.

Other objects and advantages will appear from the following detailed description of the attached drawings wherein Fig. 1 is a broken out view in side elevation of a sterilizing apparatus conveniently embodying my invention.

Fig. 2 is a fragmentary view in horizontal section taken as indicated by the angled arrows II—II in Fig. 1.

Fig. 3 is a fragmentary detail view in longitudinal section exemplifying a suitable means which may be employed to keep the can supporting trays horizontal as the conveyer rounds end sprockets in its transition from one level to another in traversing the treating chamber.

Fig. 4 is a perspective view of one of the conveyer trays.

Fig. 5 is a fragmentary view in longitudinal section through the upwardly extending opening of the treating chamber.

Fig. 6 is a sectional end view taken as indicated by the arrows VI—VI in Fig. 5.

Fig. 7 is a diagrammatic view showing various instrumentalities by which predetermined conditions of temperature are maintained within the treating chamber.

As herein shown the apparatus comprises a horizontally elongated enclosure or chamber 10 with roof, side and end walls and a bottom which may be of sheet metal and supported by a structural steel skeleton framework having an exposed base portion 11. At one end the enclosure 10 has an opening 12 in its roof with an upwardly extending wall 13 forming a throat for entry and exit of an endless conveyer 15. Except for the opening 12 the enclosure is completely enclosed. Disposed between the side chains 17 of the conveyer are trays 16 each capable of supporting multiple sealed containers C, the contents of which are to be sterilized. The conveyer 15 after entering the chamber 10 travels directly to the lower region thereof, thence traverses a rising, circuitous course back and forth horizontally within the enclosure 10 with its side chains 17 passing about end guide sprocket wheels 18 at different levels. It will be noted that substantial space is provided between the trays and the side and end walls of the enclosure. This minimizes the tendency toward plate effect condensing action in the enclosure which would bring about an undue separation of vapors in the enclosure where mixtures are employed. For the same reason, i. e. prevent undue separation of vapors, the conveyer 15, after entering the chamber 10, proceeds downwardly to the lower region thereof and thus is pre-heated before commencing its circuitous travel up through the chamber. This pre-heating of the conveyer, and of the contents which it transports, will tend to reduce vapor condensation and separation as the conveyer thereafter travels through the chamber. The trays 16 may be of the construction shown in Fig. 4, with spaced rods 19 extending crosswise of the conveyer between side members 20, and with bosses 21 centrally of said side members for pivotal connection to the conveyer chains 17. In their travel within the enclosure, the trays 16 are prevented from tilting by engagement of rollers 22 and 23 at opposite ends of the side members 20 with longitudinally extending tracks 25.

In rounding each pair of sprockets 18 as shown in Fig. 3, the trays 16 are held in horizontal position by cooperation of the rollers 22 and 23 with plain guide pulleys 26 and with toothed control wheels 27 respectively spaced equally from the sprockets, said toothed wheels being rotated by coaxially-attached auxiliary sprockets 28 meshing with the links of the conveyer chain. The total length of the conveyer path and the speed of travel in the enclosure are chosen to give the desired total sterilization time.

Arranged at intervals lengthwise of the chamber at the bottom are wells 30, 31 and 32 for containing the liquid or liquid mixture L which is to be boiled to provide the hot, heavier-than-air vapors for sterilization. The floor of the chamber is sloped as at 33 to drain toward said wells. Submerged in the wells 30, 31 and 32 are heating units 35 in the form of coils to which steam is conducted through branch pipes 36 from a main 37 under control of a valve 38.

Where a mixture of liquids is employed the lower boiling liquid is continually pumped from a suitable source of supply (not shown) through a main 40 to a charging sump 41 from which the excess returns to the pump section by way of a return main 42. From the sump 41 the lower boiling liquid passes through a pipe 43 provided with a control valve 44 which governs the flow as hereinafter described, to a distributing sump 45 from which other pipes 46, 47 and 48 with individual manual control valves 49 lead individually to the respective heating wells 30, 31 and 32. The original mixture of higher boiling liquid and lower boiling liquid, such as perchlorethylene and trichlorethylene, is supplied by way of a separate supply line 66 shown as Fig. 1.

Referring to Figs. 1, 5 and 6, the throat wall 13 of the enclosure has an external water jacket 50 extending about its lower portion through which a coolant such as cold water is constantly circulated, the coolant being introduced through pipes 51 and leaving by way of pipes 52. Within the throat in the central horizontal plane of the jacket 50 is a pipe condensing coil 53 through which a liquid coolant is likewise circulated, the inlets and outlets of said coil being respectively designated 54 and 55. By the cooling effect thus produced and by controlling the amount of heat supplied to the liquid the top level of the vapor is maintained in the throat substantially at the level indicated by the dot and dash line A—A in Figs. 1, 6 and 7. Condensate from the coil 53 and the walls of the throat is caught in a trough 56 from which drain pipes 57 and 58 lead to individual water separators 59 and 60. After removal of water in the separators 59 and 60, the condensate is conducted through piping 61, 62 and 63 into the distributing sump 45 previously referred to, introduction into the sump 45 being under regulation by a hand valve 64. Connecting into the pipe 62 is a water separator return conduit 65.

The mixture of liquids such for instance as trichlorethylene and perchlorethylene is conducted from a separate supply source (not shown) by way of a pipe line 66 with branches 67 and 68 to the wells 30 and 31 of which the latter is in communication with the well 32 by way of a pipe 69. A constant liquid level is thus maintained in the wells by the interconnecting lines 67, 68 and 69.

For automatic control of the apparatus, I have provided the instruments designated 70, 71, 72 and 73 in the diagrammatic showing of Fig. 7, these instruments being pneumatically actuated by air conducted to them individually by pipe branches 74 from a main 75 and mounted on a panel 76 conveniently located on the side wall of the enclosure nearest to the observer in Fig. 1. Interposed in the air line 75 is an air filter 77 and a valve 78 actuated by a diaphragm 79 from the water supply pipe 54 leading to the condenser coil 53 in the throat 13. Water flow in the pipe 54 thus serves to open the valve 78 in the air line and lack of water flow serves to close valve 78 thus deactivating the control instruments until such time as the water again flows.

When solvent mixtures such as trichlorethylene and perchlorethylene are used the distillate will be enriched in the lower boiling point solvent in a proportion greater than that present in the vapor state throughout the machine. In order to maintain uniform temperatures after the distillate is collected in troughs 56 it is carried through the solvent distributing sump 45 which, through properly designed weirs (not shown), uniformly distributes this lower boiling point solvent-enriched distillate to sumps 30, 31 and 32. The troughs 56 are situated beneath the water jackets and multi-pass coil condensers and the distillate is carried through water separators (which are included to remove all traces of moisture which would adversely affect the control of the vapor temperature) before it enters the solvent distributing sump.

The control instruments 70, 71, and 72 and 73 are standard instruments arranged in a particular way to accomplish the objectives of the present invention. Control instrument 70 is an air operated pressure reducing instrument which operates to control the steam pressure in such a way as to maintain the vapor level at the center-line of the water jacket 50 through cooperation with the temperature responsive element 85. The instrument 70 limits the amount of steam pressure operating to heat the liquid in the wells 30, 31 and 32 to a value to maintain the vapor level at the center-line of the water jacket and no higher. After the apparatus of the present invention has been idling the introduction of work will absorb heat and this would tend to lower the vapor level unless additional steam pressure was supplied to the heating means.

Instrument 71 is a recording instrument to make a permanent record of steam pressure recorded against time.

Instrument 72 is a temperature controller used as a safety level control. It operates in conjunction with the temperature responsive element 86 which is located above the center-line of the water jacket 50. In the event that the vapor level rises above the level of the element 86, the steam supplied is throttled or shut off until such time as the vapor level returns to the center-line of the water jacket 50.

Instrument 73 actuates valve 44 through a needle valve assembly 87 which opens to allow lower boiling liquid to pass to the distributing sump 45 in the event that the temperature of the solvent vapor within the enclosure rises above the predetermined value as indicated by the temperature responsive element 88 mounted within the enclosure and below the center-line of the water jacket 50. In connection with the operation of the needle valve assembly 87 there is provided a repeating cycle timer 89 which causes a delay in the functioning of the needle valve 87 and thus provides intermittent operation in order to check to see if the quantity of solvent allowed to flow has been sufficient to bring the vapor temperature back to the desired value.

Instrument 84 provides a continuous record of vapor temperature within the enclosure and operates in conjunction with a temperature responsive element 90. Additional temperature responsive elements may, of course, be employed to measure vapor temperature at various locations within the enclosure.

The upwardly extending opening 13 serves both as an entrance and an exit for the carriers 16. It will be noted, however, that in the region of the cooling coils 53 and the water jacket 50 there is located a further cooling means 91 which extends substantially across the central portion of the opening 13. As shown in Fig. 6 cooling element 91 is in the form of a plate coil and forms a dividing barrier as between the entrance and exit sections of the opening 13. Positioned below the plate coil 91 is a cross channel member 92 which extends entirely across the opening from the inner edge of the trough 56 at each side of the opening 13 and communicating with the trough 56 so that the condensate from the plate coil 91 is carried into the trough 56 and is ultimately redistributed to the wells 30, 31 and 32. Water connections 93 and 94 are provided for cooling plate 91 which, therefore, serves to divide the vapors in the opening 13 at the region of the vapor thus minimizing any tendency toward setting up a turbulence by virtue of the motion of the conveyer 16 traveling in opposite directions fairly close to one another in the region of the vapor line.

It will thus be seen that I have provided means for satisfactorily employing the hot vapors of liquid chlorinated hydrocarbons in the sterilization of foods. In some cases satisfactory results may be obtained by employing a single chlorinated hydrocarbon and where this is possible, the basic combination of elements which I have described operates to give the desired results. In such cases the combination consists essentially of a suitable enclosure having an upwardly extending opening at one end only but otherwise covered over and substantially closed, and within the enclosure a conveyer so arranged as to describe a circuitous path passing back and forth lengthwise of the enclosure in stacked parallel arrangement and condensing means for establishing a vapor level within the upwardly extending opening.

In other cases where the boiling point of available chlorinated hydrocarbons is not sufficiently close to the desired sterilization temperature I have provided means for using a mixture of chlorinated hydrocarbons, the ratio of the individual components being such that the desired temperature is produced in the vapor state. In such cases the hydrocarbon having the lower boiling point tends to diminish in the hydrocarbon mixture because of its higher vapor pressure with a consequent raising of the temperature of the vapor phase. One aspect of the present invention is the provision of means for automatically replenishing the mixture with lower boiling hydrocarbon, said replenishment being carried out in response to momentary increases in the temperature of the solvent vapor as measured within the enclosure.

In addition to the controlled sterilization effected by the solvent vapor which is the primary objective of the present invention, there is also obtained a very effective cleaning of the food containers by virtue of the degreasing action of the hot chlorinated hydrocarbon vapors so that the final output of the apparatus of the present invention consists of a chemically clean container of properly sterilized food.

While I have described the present invention in detail as to certain preferred embodiments, it will be understood that various modifications and changes may be made, all within the scope of the present invention as defined in the appended claims.

I claim:

1. In apparatus for sterilizing food in sealed containers with heated, heavier than air mixed chlorinated hydrocarbon vapors; an enclosed elongated chamber having an upwardly extending throat at the top at one end, at least one well in the bottom of the chamber for receiving a mixture of said chlorinated hydrocarbons, means for feeding the hydrocarbons to the well and means for heating and vaporizing the hydrocarbons, condensing means extending around the inner periphery of the throat wall between the top and bottom thereof, a similarly arranged trough for hydrocarbon condensate below the condenser and arranged to catch the condensate from the condenser and throat wall, means for supplying cooling fluid to the condenser, a water separator; means for conducting the condensate from the trough to the separator, a distributing sump and means for conducting the hydrocarbon liquid from the separator to the sump and from the sump to the well; an endless food conveyor passing downwardly through the throat opening, travelling back and forth through the chamber in a circuitous path and emerging through the throat opening, means for operating the conveyor, and conveyor carried means for transporting sealed food containers through the chamber.

2. The combination recited in the preceding claim with the additional provision of a separate supply of low boiling chlorinated hydrocarbon liquid and means for conducting same to the distributing sump.

3. The combination recited in the preceding claim and including a valve governing supply of said low boiling hydrocarbon to the distributing sump and thermal means in the chamber for actuating the valve.

4. In apparatus for sterilizing food in sealed containers with heated heavier than air mixed chlorinated hydrocarbon vapors; an enclosed elongated chamber having an upwardly extending throated opening at the top at one end, at least one well in the bottom of the chamber for receiving a mixture of said chlorinated hydrocarbons, means for feeding the hydrocarbons to the well, means for heating and vaporizing the hydrocarbons, condensing means located adjacent the bottom of the throated opening for condensing the chlorinated hydrocarbon vapors in contact therewith, means for refluxing the vapor condensate, an endless food conveyor passing downwardly through the throated opening, travelling back and forth through the chamber in a circuitous path and emerging through the throated opening, a separate supply of low boiling chlorinated hydrocarbon liquid, means for conducting the latter liquid to the well, and means responsive to variations in the temperature within said chamber for controlling the supply of the low boiling point liquid to the well.

5. Apparatus for sterilizing food in sealed containers with heated heavier than air chlorinated hydrocarbon vapors, comprising a substantially enclosed chamber for containing mixed chlorinated hydrocarbon liquids of different boiling points and their vapors, an opening at one end of the chamber, a passageway connected with the chamber opening providing separated entrance and egress for the sealed containers, means for heating and vaporizing the liquid chlorinated hydrocarbons contained within the chamber, means for delivering the mixed chlorinated hydrocarbons to the vaporizing means, condensing means located adjacent to the chamber opening for condensing the hydrocarbon vapors and restricting their passage out of the chamber, means for collecting the condensate and returning it to the vaporizing means, an endless conveyor for said food containers passing downward through said entrance passageway and opening so as to describe a circuitous path through the length of the chamber and pass from the chamber through the opening and associated egress passageway, a separate supply of low boiling chlorinated hydrocarbon liquid and means responsive to variations in the temperature within the chamber for controlling the supply of low boiling chlorinated hydrocarbon liquid to the vaporizers whereby the temperature of the chamber may be controlled by varying the ratio of the two hydrocarbons in the vaporizer.

6. In apparatus for sterilizing food in sealed containers with heated heavier than air chlorinated hydrocarbon vapors, a substantially enclosed chamber adapted to contain liquid chlorinated hydrocarbons and their vapors, said chamber having an opening therein; supply means whereby a plurality of liquid chlorinated hydrocarbons of different boiling points may be supplied to and mixed in the chamber; heating means for heating and vaporizing the liquid chlorinated hydrocarbons in the chamber; condensing means adjacent the chamber opening for condensing the vapors; means for collecting and refluxing the vapor condensate to the chamber; endless food conveyor means adapted to pass into the chamber through the opening, to travel back and forth through the chamber in a circuitous path and to emerge from the chamber through the opening; separate supply means for adding controlled quantities of the low boiling hydrocarbon to the hydrocarbon mixture in the chamber; and temperature responsive means in the chamber for controlling the supply of the low boiling hydrocarbon to the chamber.

7. The apparatus of claim 6 wherein the chamber opening consists of a conveyor ingress and a conveyor egress area, said areas being separated by vapor condensing means.

8. The apparatus of claim 6 further including a plurality of heating wells in the chamber; a water separator for removing water from the vapor condensate; and means for uniformly distributing the condensate to the heating wells.

9. In apparatus for sterilizing food in sealed containers with heated, heavier than air chlorinated hydrocarbon vapors, a substantially enclosed chamber adapted to contain a liquid chlorinated hydrocarbon and its vapors; an opening to said chamber in the form of a throat; heating means for heating and vaporizing the liquid chlorinated hydrocarbon in the chamber; means for condensing the chlorinated hydrocarbon vapors within the throat; means for collecting and refluxing the vapor condensate to the chamber, and endless food conveyor means passing into the chamber through the throat to the lower vapor region of the chamber, traveling back and forth through the vapors in the chamber in a rising, circuitous path and emerging from the chamber through the throat.

10. In apparatus for sterilizing food in sealed containers with heated, heavier than air chlorinated hydrocarbon vapors, a substantially enclosed chamber adapted to contain a liquid chlorinated hydrocarbon and its vapors; an opening to said chamber in the form of a throat; heating means for heating and vaporizing the liquid chlorinated hydrocarbon in the chamber; condensing means within the throat for condensing the chlorinated hydrocarbon vapors; means for collecting and refluxing the vapor condensate to the chamber, and endless food conveyor means passing into the chamber through the throat to the lower region of the chamber, traveling back and forth through the vapors in the chamber in a rising, circuitous path and emerging from the chamber through the throat.

11. In apparatus for sterilizing food in sealed containers with heated, heavier than air chlorinated hydrocarbon vapors; a substantially enclosed chamber; supply means for supplying to the chamber a liquid chlorinated hydrocarbon; heating means for generating in the chamber an atmosphere of hot chlorinated hydrocarbon vapors; an opening in the chamber in the form of a throat; means for condensing the chlorinated hydrocarbon vapors within the throat; means for collecting and returning the vapor distillate to the supply means, and endless food conveyer means passing into the chamber through the throat to the lower region of the vapor atmosphere in the chamber, traveling back and forth in the vapor atmosphere in a rising, circuitous path and emerging from the chamber through the throat.

References Cited in the file of this patent
UNITED STATES PATENTS

| Number | Name | Date |
|---|---|---|
| 669,250 | Birkholz | Mar 5, 1901 |
| 767,960 | Ruff | Aug. 16, 1904 |
| 781,860 | Wright | Feb. 7, 1905 |
| 801,693 | Ruff | Oct. 10, 1905 |
| 902,826 | Loew | Nov. 3, 1908 |
| 989,141 | Gettelman | Apr. 11, 1911 |
| 994,192 | Pinkney | June 6, 1911 |
| 1,596,606 | Fooks | Aug. 17, 1926 |
| 2,144,334 | Kennedy | Jan. 17, 1939 |
| 2,153,577 | Levine | Apr. 11, 1939 |
| 2,201,729 | Hood | May 21, 1940 |
| 2,214,788 | Dinley | Sept. 17, 1940 |
| 2,273,039 | Hudson | Feb. 17, 1942 |
| 2,322,693 | Kennedy | June 22, 1943 |
| 2,472,970 | Hanna | June 14, 1949 |
| 2,477,840 | Boss | Aug. 24, 1949 |
| 2,503,193 | Cessna | Apr. 4, 1950 |